(12) United States Patent
Kanakaraj et al.

(10) Patent No.: US 11,895,531 B2
(45) Date of Patent: Feb. 6, 2024

(54) METHOD AND DEVICE FOR REGULATING FLOW OF DATA TRANSMISSION IN A WIRELESS NETWORK

(71) Applicant: SAMSUNG ELECTRONICS CO., LTD., Suwon-si (KR)

(72) Inventors: Vasanth Kanakaraj, Karnataka (IN); Vishal Murgai, Karnataka (IN); Issaac Kommineni, Karnataka (IN); Sridharan Natarajan, Karnataka (IN); Shreyanshu Agarwal, Karnataka (IN); P Keerthi Priya, Karnataka (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/857,483

(22) Filed: Jul. 5, 2022

(65) Prior Publication Data

US 2023/0007526 A1 Jan. 5, 2023

(30) Foreign Application Priority Data

Jul. 5, 2021 (IN) .............................. 202141030200
Jun. 24, 2022 (IN) .............................. 2021 41030200

(51) Int. Cl.
*H04W 28/02* (2009.01)
*H04L 43/026* (2022.01)
*H04L 47/2425* (2022.01)

(52) U.S. Cl.
CPC ....... *H04W 28/0273* (2013.01); *H04L 43/026* (2013.01); *H04L 47/2433* (2013.01)

(58) Field of Classification Search
None
See application file for complete search history.

(56) References Cited

U.S. PATENT DOCUMENTS 10,638,356 B2    4/2020  Andrews et al.
2006/0217923 A1* 9/2006  Ma ........................ H04L 43/00
                                                       702/179

(Continued)

FOREIGN PATENT DOCUMENTS

AU     2014200413    2/2014
CN     112787942     5/2021

(Continued)

OTHER PUBLICATIONS

Technical Blog, "NVIDIA and Palo Alto Networks Deliver Unprecedented Firewall Performance for 5G Cloud-Native Security with DPU Acceleration", 2020, 3 pages.

(Continued)

*Primary Examiner* — Kodzovi Acolatse
(74) *Attorney, Agent, or Firm* — Nixon & Vanderhye P.C.

(57) ABSTRACT

The disclosure relates to a 5G or 6G communication system for supporting a higher data transmission rate. The method comprises: receiving a flow index corresponding to a plurality of applications available at an electronic device, wherein the flow index represents a type of the flow, and a priority of the flow; determining whether connection for the data transmission exists between the electronic device and an internet server based on the flow index; performing one of regulating the flow based on the flow index in response to determining that the connection for the data transmission exists between the electronic device and the internet server, and discarding the flow index received from the electronic device for regulation of the flow in response to determining that the connection for the data transmission does not exists.

16 Claims, 17 Drawing Sheets

(56) References Cited

U.S. PATENT DOCUMENTS

| | | | |
|---|---|---|---|
| 2017/0374090 A1* | 12/2017 | McGrew | H04L 41/16 |
| 2019/0036842 A1* | 1/2019 | Aranha | H04L 45/306 |
| 2020/0053010 A1 | 2/2020 | Huang-Fu et al. | |
| 2020/0145876 A1* | 5/2020 | Dao | H04W 28/06 |
| 2020/0221527 A1* | 7/2020 | Bharatia | H04W 8/02 |
| 2021/0329484 A1 | 10/2021 | Xie et al. | |
| 2021/0336889 A1* | 10/2021 | Yaswi | H04L 41/0895 |
| 2022/0006748 A1 | 1/2022 | Pallagatti Kotrabasappa et al. | |
| 2022/0014963 A1* | 1/2022 | Yeh | G06N 7/01 |
| 2022/0294740 A1* | 9/2022 | Burkhalter, Jr. | G06N 20/00 |
| 2023/0007526 A1* | 1/2023 | Kanakaraj | H04L 47/2433 |
| 2023/0021830 A1* | 1/2023 | Sun | H04W 28/0992 |
| 2023/0063618 A1* | 3/2023 | Burnett | H04W 16/28 |
| 2023/0096468 A1* | 3/2023 | Ong | H04L 47/283 370/235 |

FOREIGN PATENT DOCUMENTS

| | | |
|---|---|---|
| KR | 10-2019-0055534 | 5/2019 |
| WO | 2020/168236 | 8/2020 |

OTHER PUBLICATIONS

[Online], "Keep Pets and Elephants Away: Dynamic Process Location Management in 5G Zoo", uploaded Apr. 27, 2018, 8 pages.

At a Glance: Juniper @ Supercomputing 17, "Juniper secures big data flow with flow classification—Firewall Implementation for Elephant flows using hardware acceleration", 2018, one (1) page.

Slattery, "A Story of Mice and Elephants: Dynamic Packet Prioritization", Enterprise Connection, Jan. 23, 2017, 4 pages.

Xiao et al., "An Efficient Elephant Flow Detection with Cost-Sensitive in SDN", INISCom, Mar. 2-4, 2015, 5 pages.

Tang et al., "Elephant Flow Detection and Differentiated Scheduling with Efficient Sampling and Classification", IEEE Transactions on Cloud Computing, 2017, 15 pages.

Zaw et al., "Elephant Flow Detection and Delay-Aware Flow Rerouting in Software-Defined Network", 2017, 6 pages.

Cisco, "Intelligent Buffer Management on Cisco Nexus 9000 Series Switches", 2017, 22 pages.

Indian Office Action dated Feb. 10, 2023 in corresponding Indian Patent Application No. 202141030200.

* cited by examiner

METHOD AND DEVICE FOR REGULATING FLOW OF DATA TRANSMISSION IN A WIRELESS NETWORK

CROSS-REFERENCE TO RELATED APPLICATIONS

This application is based on and claims priority under 35 U.S.C. § 119 to Indian Provisional Patent Application No. 202141030200, filed on Jul. 5, 2021, in the Indian Patent Office, and to Indian Complete Patent Application No. 202141030200, filed on Jun. 24, 2022, in the Indian Patent Office, the disclosures of all of which are incorporated by reference herein in their entireties.

BACKGROUND

Field

The disclosure relates to a method and device for regulating flow of data transmission in a wireless network.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Accordingly an example embodiment herein provides a method for regulating flow of data transmission in a wireless network. The method includes: receiving, by a network device in the wireless network, flow index corresponding to multiple applications available at an electronic device in the wireless network, wherein the flow index represents a type of the flow of the data transmission between the electronic device and the network device, and a priority of the flow of the data transmission; determining, by the network device, whether connection for the data transmission exists between the electronic device and an internet server based on the flow index; performing, by the network device, one of regulating the flow of the data transmission between the electronic device and the network device based on the flow index in response to determining that the connection for the data transmission exists between the electronic device and the internet server, and discarding the flow index received from the electronic device for regulation of the flow of the data transmission between the electronic device and the network device in response to determining that the connection for the data transmission does not exists between the electronic device and the internet server.

Accordingly an example embodiment herein provides a method for regulating flow of data transmission in a wireless network. The method includes: detecting, by an electronic device in the wireless network, the flow of the data transmission between the electronic device and a network device in the wireless network, wherein the flow is associated with one or more applications available at the electronic device; determining, by the electronic device, a type of the detected flow of the data transmission, and a priority of the detected flow of the data transmission, and an estimated duration of the detected flow of the data transmission by applying Artificial Intelligence (AI) model on the detected flow of the data transmission between the electronic device and the network device; creating, by the electronic device, flow index for the one or more applications, wherein the flow index represents the type of the detected flow of the data transmission, and the priority of the detected flow of the data transmission, and the estimated duration of the detected flow of the data transmission; transmitting, by the electronic device, the created least one flow index to the network device for regulating the detected flow of data transmission between the electronic device and the network device.

These and other aspects of the various example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the disclosure herein without departing from the spirit thereof, and the embodiments herein include all such modifications.

BRIEF DESCRIPTION OF THE DRAWINGS

The disclosure is illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1A:
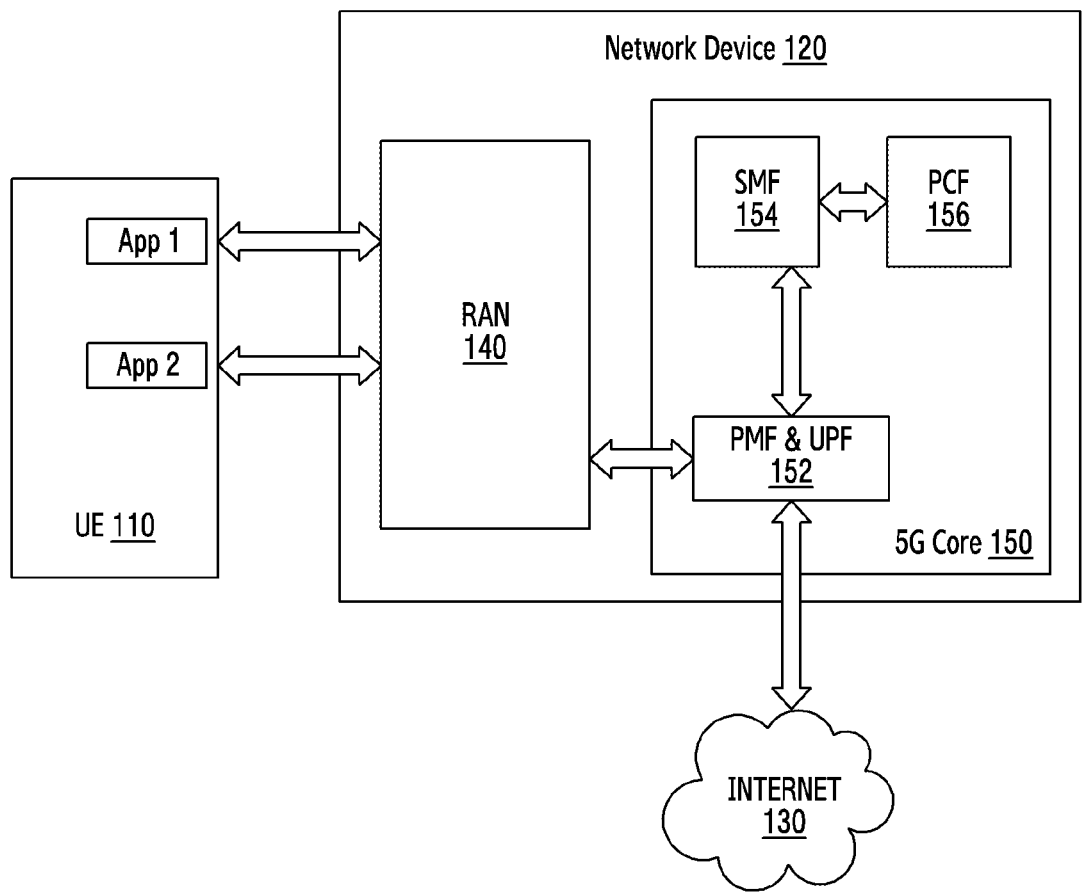
FIG. 1A is a block diagram illustrating an example configuration of a system for regulating flow of data transmission in a wireless network, according to the prior art.

The embodiments herein and the various features and advantageous details thereof are explained in greater detail below with reference to the non-limiting embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be understood to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The terms "electronic device", "user equipment", and "UE" may refer to the same and may be used interchangeably throughout this disclosure.

The various example embodiments disclosed herein provide a method for regulating flow of data transmission between an electronic device and a network device in a wireless network. In the present disclosure, the regulation of the flow of the data transmission is performed based on parameter known as "flow index" created at the electronic device and transmitted to the network device.

The various example embodiments disclosed herein to provide an electronic device for regulating flow of data transmission in the wireless network.

The various example embodiments disclosed herein provide a network device for regulating flow of data transmission in the wireless network.

Accordingly the various example embodiments herein provide a method for regulating flow of data transmission in a wireless network. The method includes receiving, by a network device in the wireless network, flow index corresponding to multiple applications available at an electronic device in the wireless network, wherein the flow index represents a type of the flow of the data transmission between the electronic device and the network device, and a priority of the flow of the data transmission. The method also includes determining, by the network device, whether connection for the data transmission exists between the electronic device and an internet server based on the flow index. The method further includes performing, by the network device, one of regulating the flow of the data transmission between the electronic device and the network device based on the flow index in response to determining that the connection for the data transmission exists between the electronic device and the internet server, and discarding the flow index received from the electronic device for regulation of the flow of the data transmission between the electronic device and the network device in response to determining that the connection for the data transmission does not exists between the electronic device and the internet server.

In the conventional methods and systems, bandwidth regulation for one or more applications available at the electronic device is performed based on best-effort paradigm, which could not provide necessary precision required for delivering seamless user experience, increases congestion in the network, and also increases latency involved for data transmission between the electronic device and a network device. Unlike to the conventional methods and systems, in the present disclosure the bandwidth regulation is performed intelligently for the one or more applications available at the electronic device using a flow index created at the electronic device.

Referring now to the drawings and more particularly to FIGS. 1A through 11, where similar reference characters denote corresponding features consistently throughout the figures, there are shown various example embodiments.

FIG. 1A is a block diagram illustrating a configuration of a system for regulating flow of data transmission in a wireless network, according to the prior art.

As shown in FIG. 1A, the system includes an electronic device 110, a network device 120, and internet 130. The electronic device 110 includes one or more applications available at the electronic device 110. The network device 120 includes a Radio Access Network (RAN) 140 and a 5G core 150. The 5G core 150 includes a PMF & UPF 152, a SMF 154, and a PCF 156. As shown in FIG. 1A, when two applications (App1 and App2) are running at the electronic device 110 according to conventional method, the two applications are allotted with equal bandwidth or network resources. However, allocating equal bandwidth or network resources for the two applications reduces a user experience and increases a delay for time sensitive applications. For example, when the first application (i.e., App1) is a message application and the second application (i.e., App2) is a media streaming application, providing equal bandwidth or the network resource for the two applications increases the latency and time delay for messages sent using the message application. Thus, in the conventional method there is no regulation provided for the flow of data transmission related to the one or more applications available at the electronic device 110.

Figure 1B:
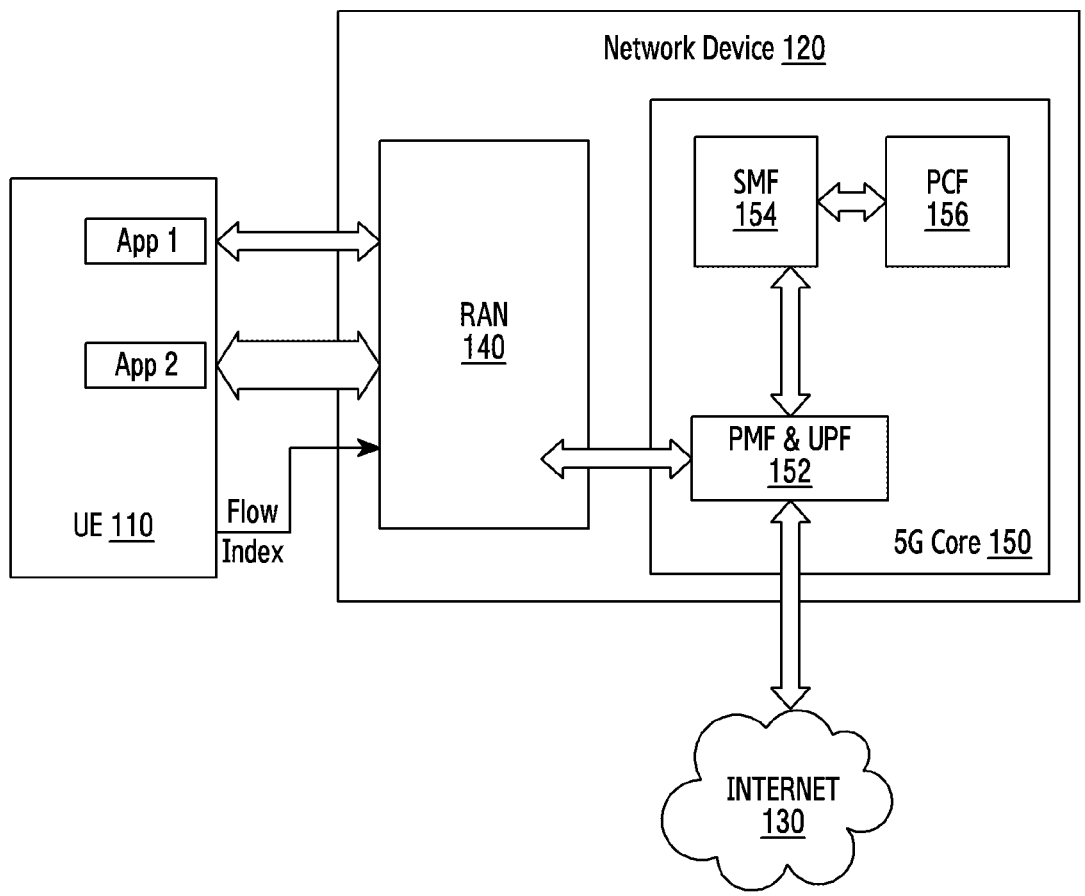
FIG. 1B is a block diagram illustrating an example configuration of a system for regulating the flow of the data transmission with flow index in the wireless network, according to various embodiments.

FIG. 1B is a block diagram illustrating an example configuration of a system for regulating the flow of the data transmission with the flow index in the wireless network, according to various embodiments.

As shown in FIG. 1B, in the modified system, the electronic device 110 generates a parameter known as "Flow Index" and is transmitted to the network device 120. Using the flow index, the network device 120 regulates flow of data transmission related to the one or more applications. Based on the flow index, the network device 120 regulates the flow of data transmission for the App1 by setting a high priority for the flow and allocating less bandwidth, and regulates flow of data transmission for the App2 by setting a low priority for the flow and allocating high bandwidth.

Figure 2:
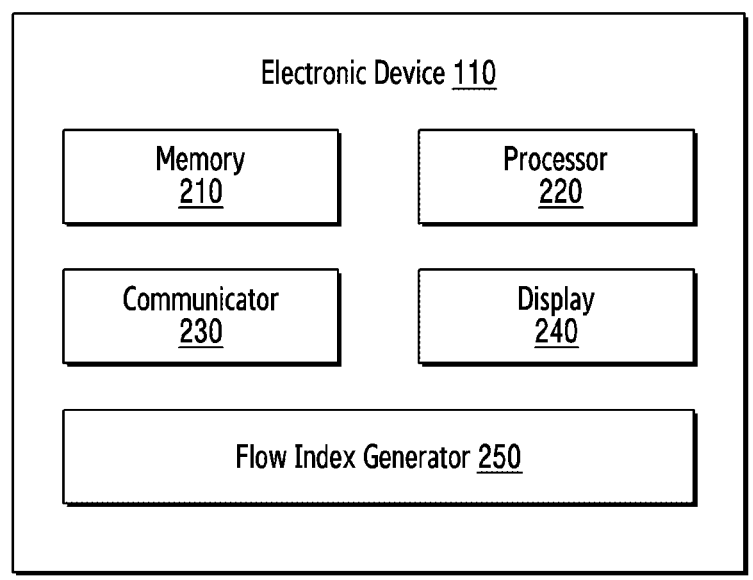
FIG. 2 is a block diagram illustrating an example configuration of an electronic device for regulating the flow of the data transmission in the wireless network, according to various embodiments.

FIG. 2 is a block diagram illustrating an example configuration of the electronic device 110 for regulating the flow for the data transmission, according to various embodiments. In an embodiment, the electronic device 110 includes a memory 210, a processor (e.g., including processing circuitry) 220, a communicator (e.g., including communication circuitry) 230, a display 240, and a flow index generator (e.g., including various processing circuitry and/or executable program instructions) 250.

The memory 210 also stores instructions to be executed by the processor 220. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210 is non-movable. In some examples, the memory 210 can be configured to store larger amounts of information than the memory. In certain examples, a non-transitory storage medium may store data that can, over time, change (e.g., in Random Access Memory (RAM) or cache). In an embodiment, the memory 210 can be an internal storage unit or it can be an external storage unit of the User Equipment (UE) 200, a cloud storage, or any other type of external storage. The processor 220 communicates with the memory 210, the communicator 230, and the flow index generator 250. The processor 220 is configured to execute instructions stored in the memory 210 and to perform various processes.

The communicator 230 may include various communication circuitry and is configured for communicating internally between internal hardware components and with external devices via one or more networks.

In an embodiment, the flow index generator 250 may include various processing circuitry and/or executable program instructions and creates flow index for the one or more applications. In an embodiment, initially the flow index generator 250 detects the flow of the data transmission between the electronic device 110 and the network device 120 in the wireless network, wherein the flow is associated with the one or more applications available at the electronic device 110. The flow index generator 250 determines a type of the detected flow of the data transmission, and a priority of the detected flow of the data transmission by applying Artificial Intelligence (AI) model on the detected flow of the data transmission between the electronic device 110 and the network device 120. The flow index generator 250 then creates the flow index for the one or more applications, wherein the flow index represents the type of the detected flow of the data transmission, and the priority of the detected flow of the data transmission.

In an embodiment, the flow index generator 250 creates the flow index that includes a hash value of 5-tuple data associated with corresponding application, the type of the flow of the data transmission, and the priority of the flow of the data transmission. In an embodiment, the 5-tuple data includes a source Internet Protocol (IP) address, a source Port number, a destination IP address, and a protocol type used by the corresponding application.

In an embodiment, the electronic device 110 includes artificial intelligence (AI) model. The electronic device 110 monitors multiple parameters associated with multiple applications available at the electronic device 110 for a time period, wherein the multiple parameters includes a type of flow created between the multiple applications running at the electronic device 110 and the network device 120, a duration spent by the multiple applications running at the electronic device 110 in one of foreground and background while using the flow, a date on which the plurality of applications are running on the electronic device 110 to use the flow, a usage pattern of the multiple applications at the electronic device 110 to use the flow, and a total amount of data transmitted and received by the multiple applications using the flow. Upon monitoring the multiple parameters, the electronic device 110 is configured to train the AI model based on the multiple monitored parameters associated with the multiple applications. In an embodiment, the flow index generator 250 determines the priority of the detected flow of the data transmission based on an estimated duration of the flow. The estimated duration of the flow is determined by applying the AI model on the detected flow of the data transmission between the electronic device 110 and the network device 120.

In an embodiment, the communicator 230 is configured to transmit the created flow index to the network device 120 for regulating the detected flow of the data transmission between the electronic device 110 and the network device 120.

Although FIG. 2 shows various hardware components of the electronic device 110 but it is to be understood that other embodiments are not limited thereon. In other embodiments, the electronic device 110 may include less or more number of components. Further, the labels or names of the components are used only for illustrative purpose and does not limit the scope of the disclosure. One or more components can be combined together to perform same or substantially similar function to regulate the flow of the data transmission between the electronic device 110 and the network device 120.

Figure 3:
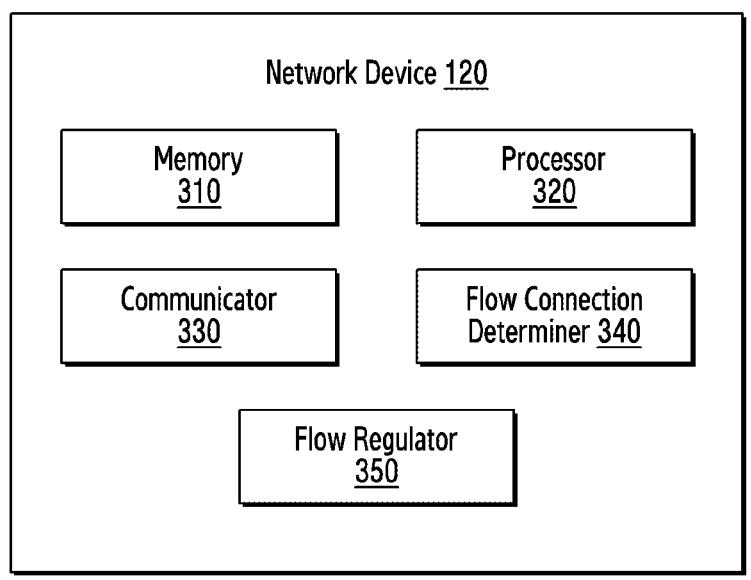
FIG. 3 is a block diagram illustrating an example configuration of a network device for regulating flow of the data transmission in the wireless network, according to various embodiments.

FIG. 3 is a block diagram illustrating an example configuration of the network device 120 for regulating the flow of the data transmission, according to various embodiments. In an embodiment, the network device 120 includes a memory 310, a processor (e.g., including processing circuitry) 320, a communicator (e.g., including communication circuitry) 330, a flow connection determiner (e.g., including various processing circuitry and/or executable program instructions) 340, and a flow regulator (e.g., including various processing circuitry and/or executable program instructions) 350.

The memory 310 also stores instructions to be executed by the processor 320. The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "non-transitory" may indicate that the storage medium is not embodied in a carrier wave or a propagated signal. However, the term "non-transitory" should not be interpreted that the memory 310 is non-movable. In some examples, the memory 310 can be configured to store larger amounts of information than the memory. In certain examples, a non-transitory storage medium may store data that can, over time, change (e.g., in Random Access Memory (RAM) or cache). In an embodiment, the memory 310 can be an internal storage unit or it can be an external storage unit of the network device 120, a cloud storage, or any other type of external storage.

The processor 320 may include various processing circuitry and communicates with the memory 310, the communicator 330, the flow connection determiner 340, and the flow regulator 350. The processor 320 is configured to execute instructions stored in the memory 310 and to perform various processes.

The communicator 330 may include various communication circuitry and is configured for communicating internally between internal hardware components and with external devices via one or more networks.

In an embodiment, the communicator 330 is configured to receive flow index corresponding to a multiple applications available at the electronic device 110 in the wireless network, wherein the flow index represents a type of the flow of the data transmission between the electronic device 110 and the network device 120, and a priority of the flow of the data transmission.

In an embodiment, the flow connection determiner 340 is configured to determine whether a connection for the data transmission exists between the electronic device 110 and an internet server based on the flow index.

In an embodiment, the flow regulator 350 is configured to regulate the flow of the data transmission between the electronic device 110 and the network device 120 based on the flow index in response to determining that the connection for the data transmission exists between the electronic device 110 and the internet server.

In an embodiment, the flow regulator 350 is configured to discard the flow index received from the electronic device 110 for regulation of the flow of the data transmission between the electronic device 110 and the network device 120 in response to determining that the connection for the data transmission does not exists between the electronic device 110 and the internet server.

In an embodiment, to regulate the flow of the data transmission between the electronic device 110 and the network device 120 based on the flow index, the flow regulator 350 is configured to determine whether the electronic device 110 has a multipath capabilities. The flow regulator 350 is then configured to regulate the flow of the data transmission by transmitting the flow of the data transmission to a multiple data paths of the multipath capabilities of the electronic device 110 based on the flow index in response to the determination that the electronic device 110 has the multipath capabilities. The flow regulator 350 is then configured to regulate the flow of the data transmission by transmitting the flow of the data transmission to a single data path based on the flow index in response to the determination that the electronic device 110 does not has the multipath capabilities.

In an embodiment, to transmit the flow of the data transmission to the multiple data paths of the multipath capabilities of the electronic device 110 based on the flow index, the flow regulator 350 is configured to determine whether the flow index of application from the multiple applications indicates one of the type of the flow as an elephant flow or a mice flow, and the priority of the flow as a high priority or a low priority.

The flow regulator 350 is then configured to transmit the flow of the data transmission of the application in a low Round Trip Time (RTT) path of the multiple data paths of the multipath capabilities of the electronic device 110 in response to determining that "the type of the flow as the elephant flow, and the priority of the flow as the high priority" and "the type of the flow as the mice flow".

The flow regulator 350 is then configured to transmit the flow of the data transmission of the application in a high Round Trip Time (RTT) path of the multiple data paths of the multipath capabilities of the electronic device 110 in response to determining that "the type of the flow as the elephant flow, and the priority of the flow as the low priority".

In an embodiment, The low RTT path is shorter than the high RTT path.

In an embodiment, to regulate the flow of the data transmission by transmitting the flow of data transmission to the single data path based on the flow index, the flow regulator 350 is configured to determine whether the flow index of application from the multiple applications indicates one of the type of the flow as an elephant flow or a mice flow, and the priority of the flow as a high priority or low priority.

The flow regulator 350 is then configured to prioritize the flow of the data transmission of the application in response to determining that "the type of the flow as the elephant flow, and the priority of the flow as the high priority" and "the type of the flow as the mice flow". The flow regulator 350 is then configured to transmit the prioritized flow of the data transmission of the application in the single path.

The flow regulator 350 is then configured to control bandwidth for the flow of the data transmission of the application in response to determining that "the type of the flow as the elephant flow, and the priority of the flow as the low priority. In an embodiment, the flow regulator controls the bandwidth using Active Queue Management (AQM), Explicit Congestion Notification (ECN), and moderating advertised Receive Window Size (RWND).

Although FIG. 3 shows various hardware components of the network device 120 but it is to be understood that other embodiments are not limited thereon. In other embodiments, the network device 120 may include less or more number of components. Further, the labels or names of the components are used only for illustrative purpose and does not limit the scope of the disclosure. One or more components can be combined together to perform same or substantially similar function to regulate flow of data transmission in a wireless network.

Figure 4:
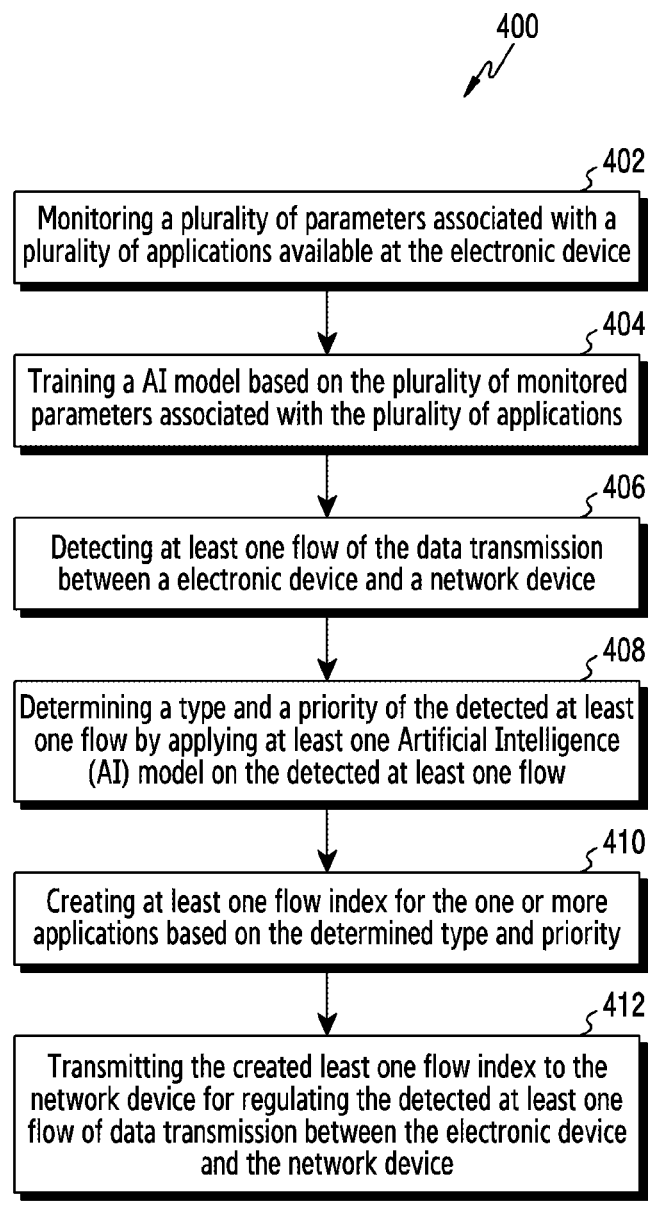
FIG. 4 is a flowchart illustrating an example method for regulating the flow of the data transmission in the wireless network, according to various embodiments.

FIG. 4 is a flowchart illustrating an example method for regulating the flow of the data transmission in the wireless network, according to various embodiments.

At 402, the method includes monitoring, by the electronic device 110, the multiple parameters associated with a multiple applications available at the electronic device for a time period. In an embodiment, the multiple parameters includes a type of flow created between the multiple applications running at the electronic device 110 and the network device 120, a duration spent by the multiple applications running at the electronic device 110 in one of foreground and background while using the flow, a date on which the multiple applications are running on the electronic device 110 to use the flow, a usage pattern of the multiple applications at the electronic device 110 to use the flow, and a total amount of data transmitted and received by the multiple applications using the flow.

At 404, the method includes training, by the electronic device 110, the AI model based on the multiple monitored parameters associated with the multiple applications.

At 406, the method includes detecting, by the electronic device 110, the flow of the data transmission between the electronic device 110 and the network device 120, wherein the flow is associated with one or more applications available at the electronic device 110.

At 408, the method includes determining, by the electronic device 110, a type of the detected flow of the data transmission, and a priority of the detected flow of the data transmission by applying the Artificial Intelligence (AI) model on the detected flow of the data transmission between the electronic device 110 and the network device 120. In an embodiment, the priority of the detected flow of the data transmission is determined based on an estimated duration of the flow. The estimated duration of the flow is determined by applying the AI model on the detected flow of the data transmission between the electronic device 110 and the network device 120.

At 410, the method includes creating, by the electronic device 110, flow index for the one or more applications, wherein the flow index represents the type of the detected flow of the data transmission, and the priority of the detected flow of the data transmission.

At 412, the method includes transmitting, by the electronic device 110, the created flow index to the network device 120 for regulating the detected flow of data transmission between the electronic device 110 and the network device 120. In an embodiment, the flow index is transmitted to the network device 120 using an Access Traffic Steering, Switching & Splitting (ATSSS) framework via Performance Measurement Function (PMF) protocol.

Figure 5:
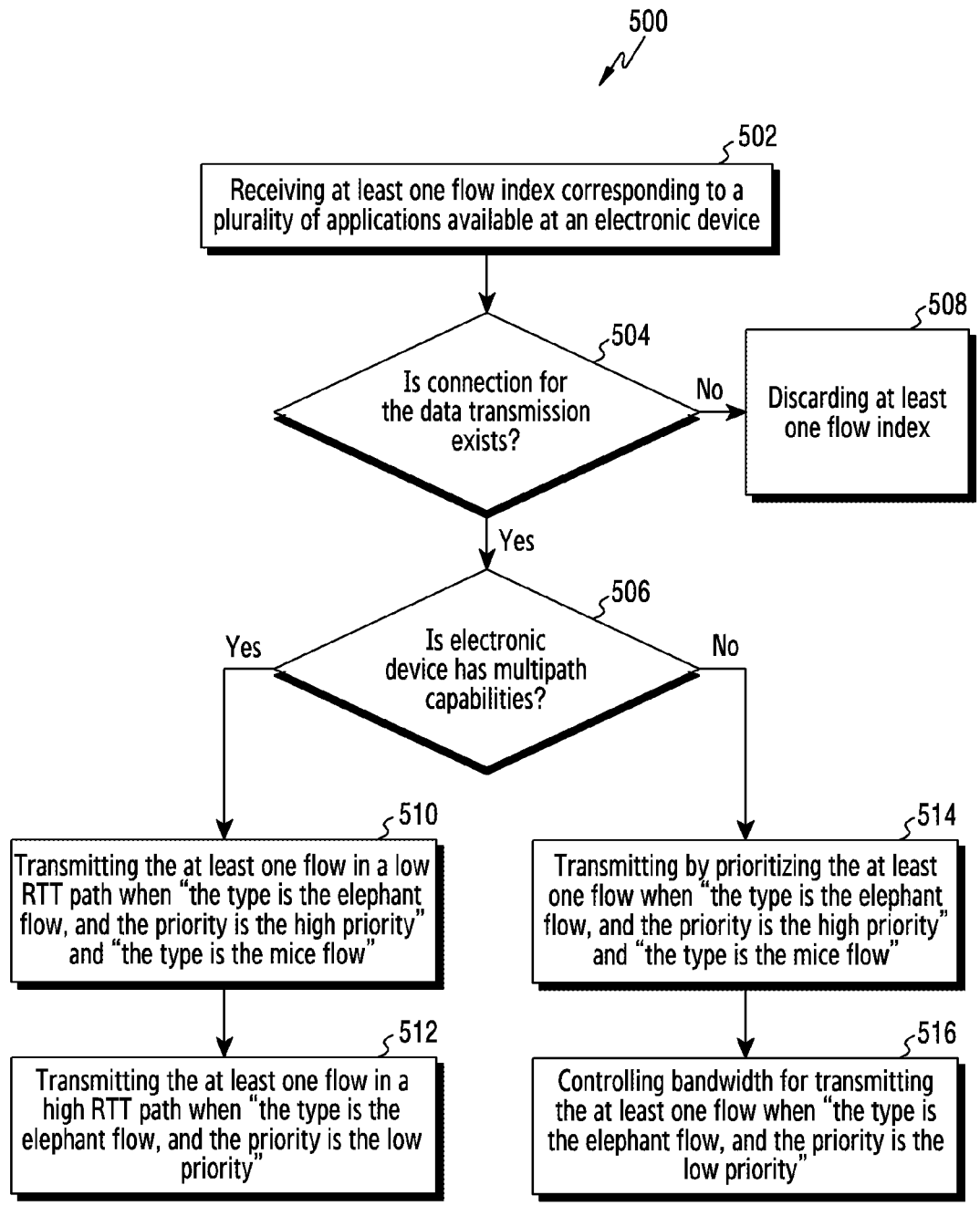
FIG. 5 is a flowchart illustrating an example method for regulating the flow of the data transmission in the wireless network, according to various embodiments.

FIG. 5 is a flowchart illustrating an example method for regulating the flow of the data transmission in the wireless network, according to various embodiments.

At 502, the method includes receiving, by the network device 120, flow index corresponding to a multiple applications available at the electronic device 110, wherein the flow index represents a type of the flow of the data transmission between the electronic device 110 and the network device 120, and a priority of the flow of the data transmission.

At 504, the method includes determining, by the network device, whether connection for the data transmission exists between the electronic device 110 and an internet server based on the flow index.

At 506, the method includes determining, by the network device, whether the electronic device 110 has a multipath capabilities in response to the determination that the connection for the data transmission exists between the electronic device 110 and the internet server.

At 508, the method includes discarding, by the network device, flow index in response to the determination that the connection for the data transmission does not exists between the electronic device 110 and the internet server.

At 510, the method includes transmitting the flow in a low RTT path when "the type is the elephant flow, and the priority is the high priority" and "the type is the mice flow".

At 512, the method includes transmitting the flow in a high RTT path when "the type is the elephant flow, and the priority is the low priority". In an embodiment, The low RTT path is shorter than the high RTT path At 514, the method includes transmitting by prioritizing the flow when "the type is the elephant flow, and the priority is the high priority" and "the type is the mice flow".

At 516, the method includes controlling bandwidth for transmitting the flow when "the type is the elephant flow, and the priority is the low priority". In an embodiment, controlling the bandwidth for transmitting the flow is performed using Active Queue Management (AQM), Explicit Congestion Notification (ECN), and moderating advertised Receive Window Size (RWND).

Figure 6A:
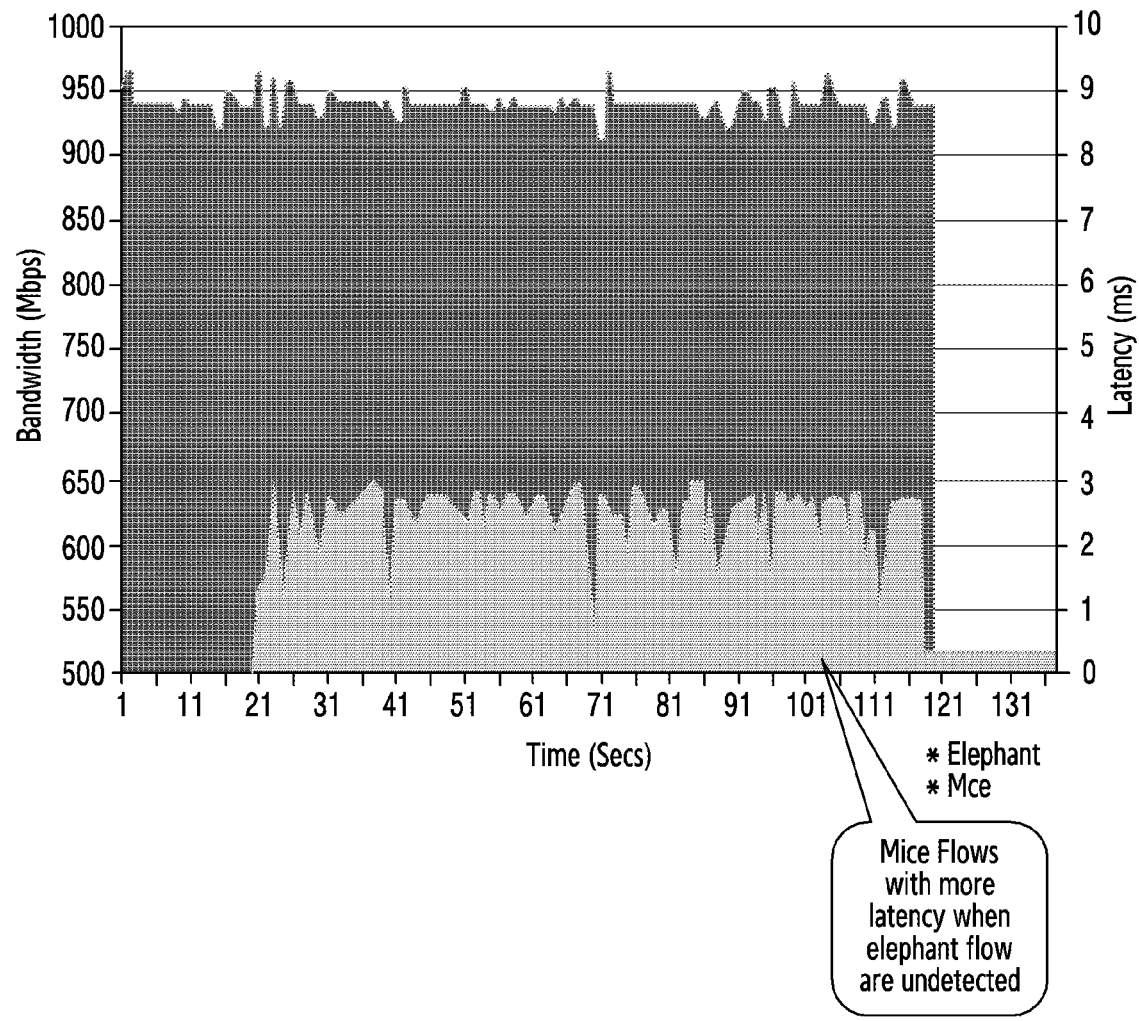
FIG. 6A is a graph illustrating bandwidth consumption, according to the prior art.
Figure 6B:
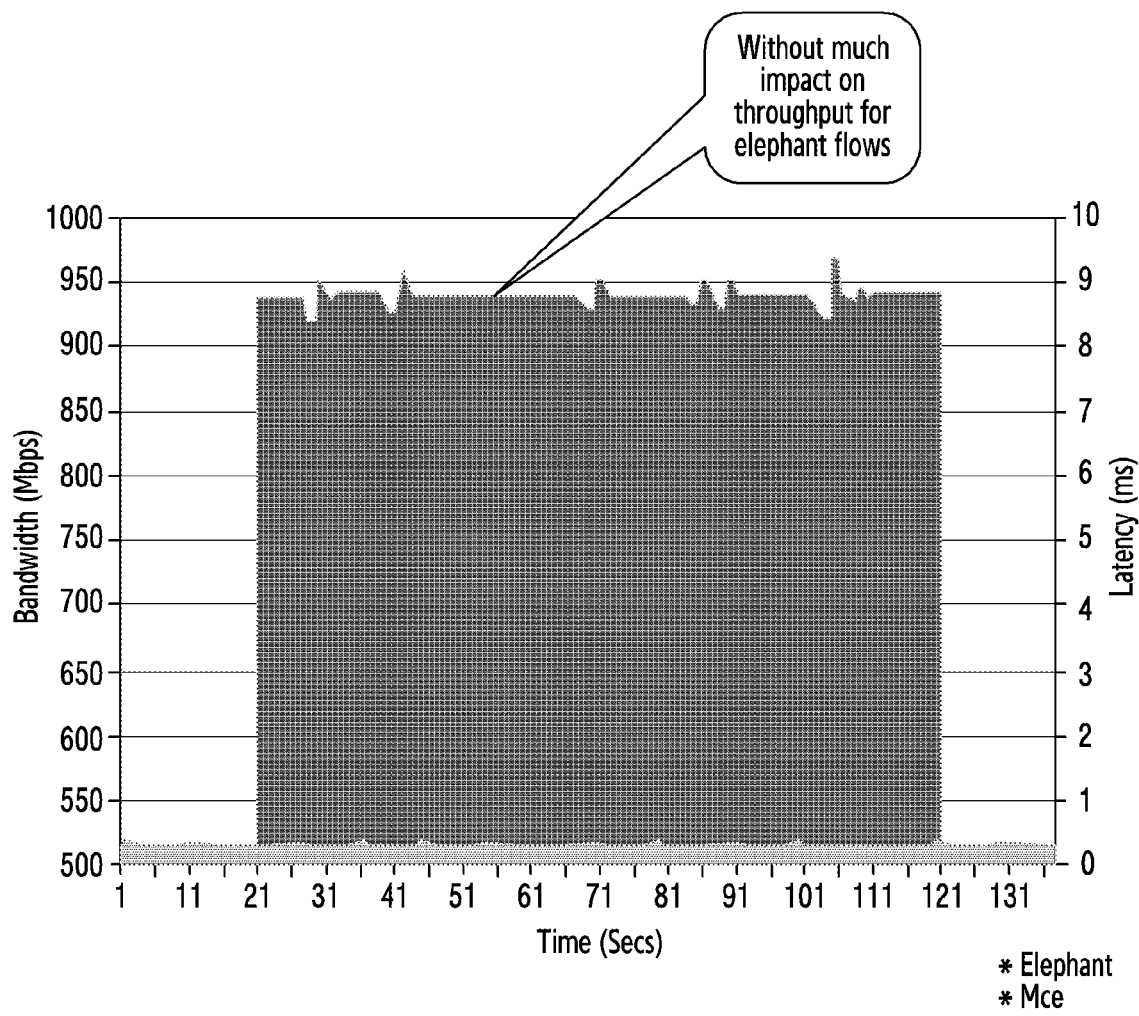
FIG. 6B is a graph illustrating example bandwidth consumption, according to various embodiments.

FIG. 6A is a graph illustrating bandwidth consumption, according to the prior art. FIG. 6B is a graph illustrating example bandwidth consumption, according to various embodiments.

As shown in FIG. 6A and FIG. 6B, the disclosed method improves the throughput by 12% to 16% by ensuring faster Flow Completion Time (FCT) for mice flows.

Figure 7A:
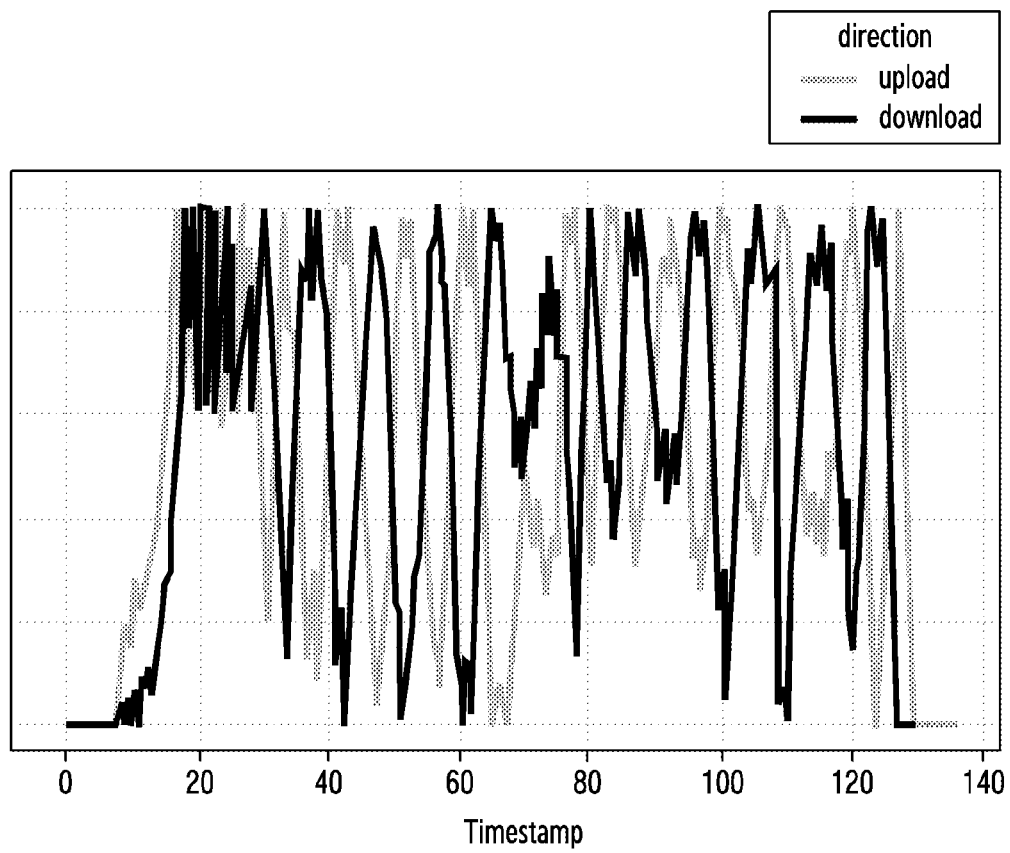
FIG. 7A is a graph illustrating data traffic transmission, according to the prior art.
Figure 7B:
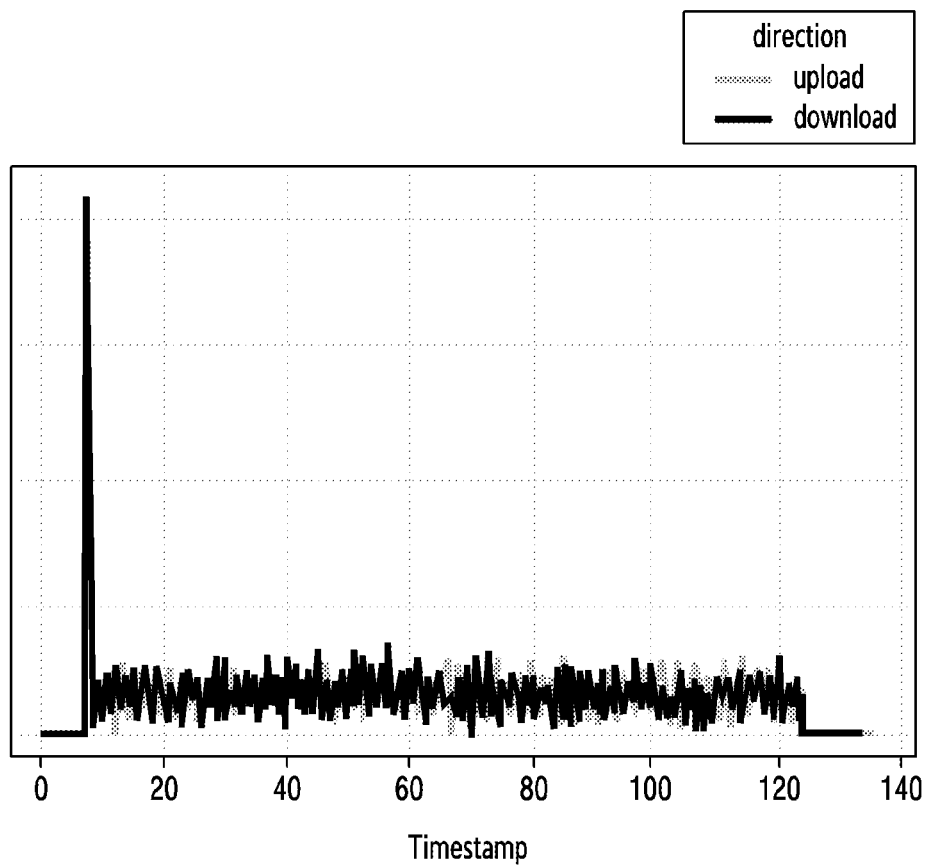
FIG. 7B is a graph illustrating example data traffic transmission, according to various embodiments.

FIG. 7A is a graph illustrating data traffic transmission, according to the prior art, FIG. 7B is a graph illustrating data traffic transmission, according to various embodiments.

As shown in FIG. 7A and FIG. 7B, the disclosed method helps the network device to regulate the flows that are sending high traffic both in upload and download.

Figure 8A:
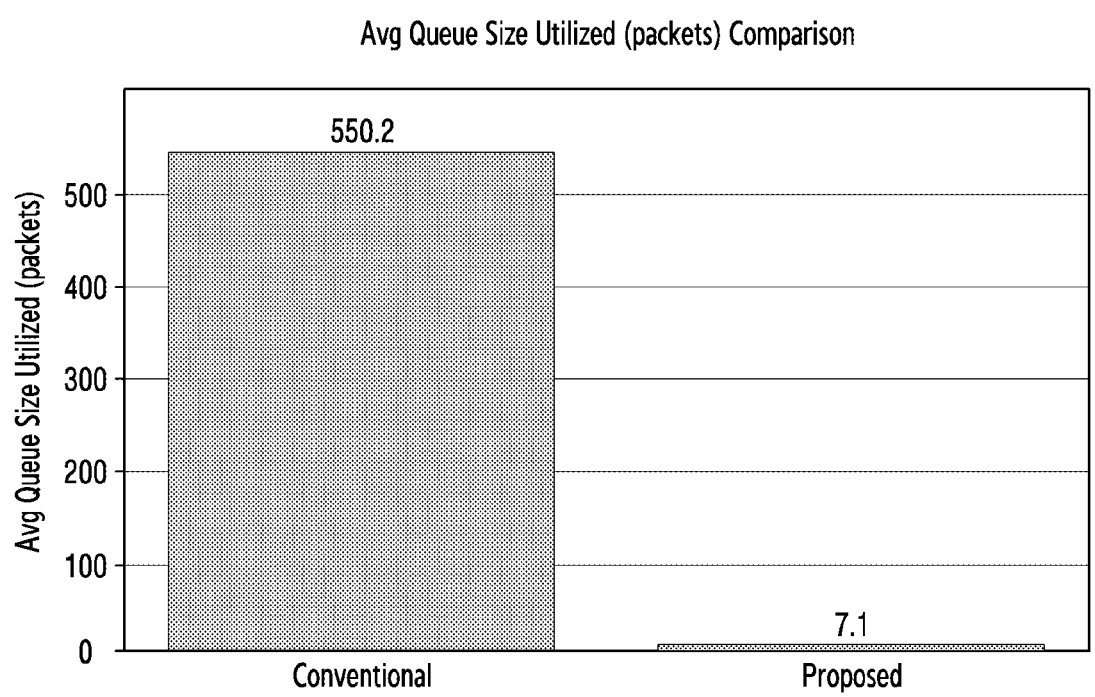
FIG. 8A is a graph illustrating a comparison of average queue size utilized, according to the prior art and to various embodiments.

FIG. 8A is graph illustrating a comparison of average queue size utilized, according to the prior art and various embodiments.

As shown in FIG. 8A, the disclosed method achieves controlled queue utilization compared to conventional methods.

Figure 8B:
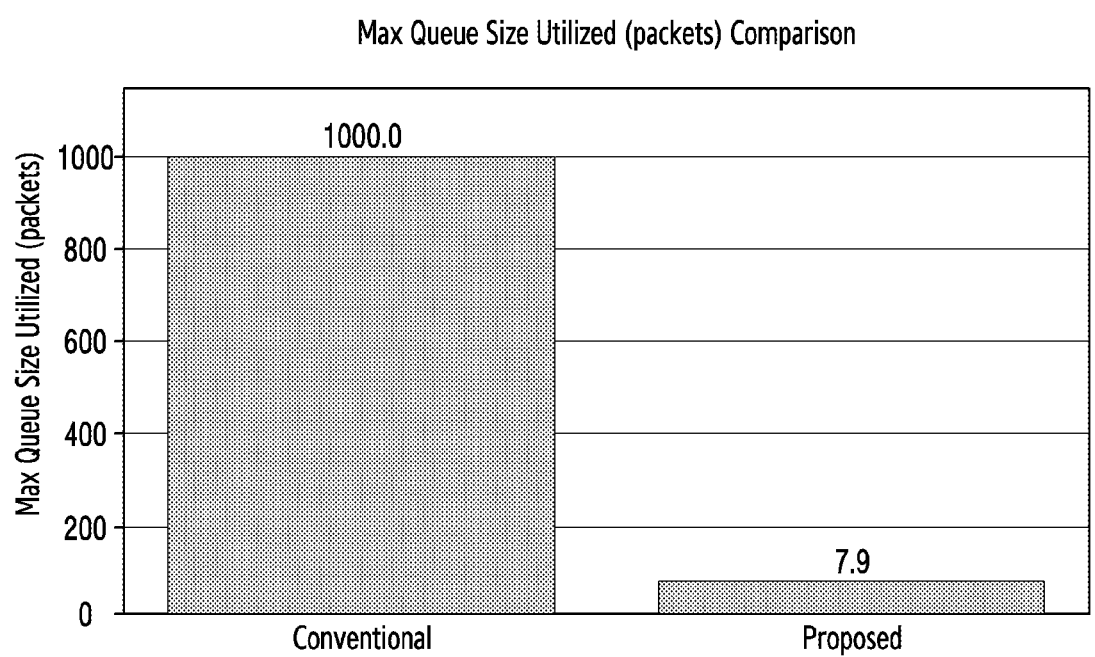
FIG. 8B is a graph illustrating a comparison of maximum queue size utilized, according to the prior art and various embodiments.

FIG. 8B is a graph illustrating a comparison of maximum queue size utilized, according to the prior art and various embodiments.

As shown in FIG. 8B, the disclosed method achieves controlled queue utilization compared to conventional methods.

Figure 8C:
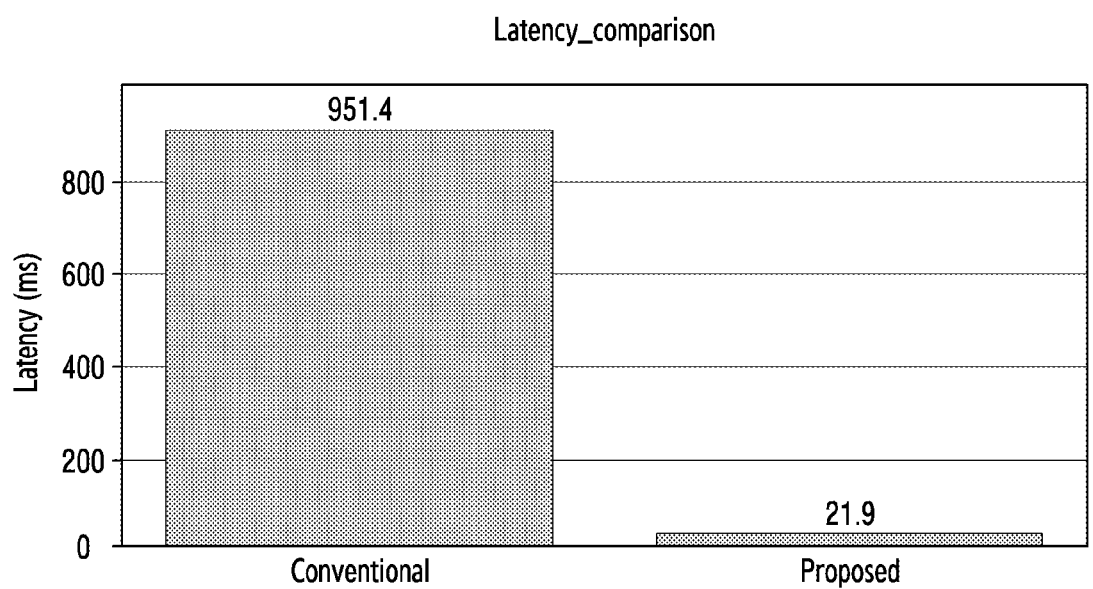
FIG. 8C is a graph illustrating a comparison of latency involved, according to the prior art and various embodiments.

FIG. 8C is a graph illustrating a comparison of latency involved, according to the prior art and various embodiments.

As shown in FIG. 8C, the disclosed method achieves reduced latency compared to conventional methods.

Figure 9A:
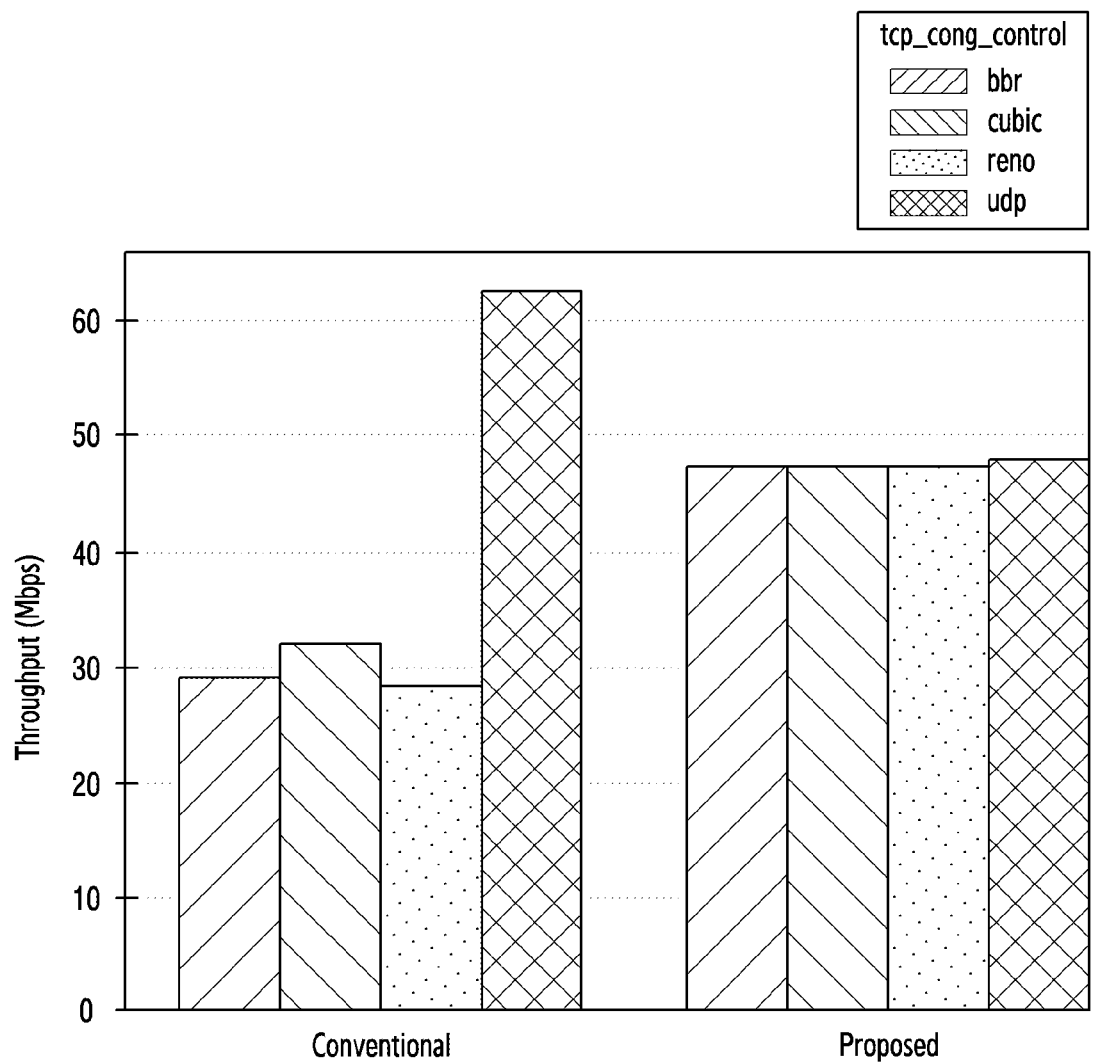
FIG. 9A is a graph illustrating a comparison of download throughput, according to the prior art and various embodiments.
Figure 9B:
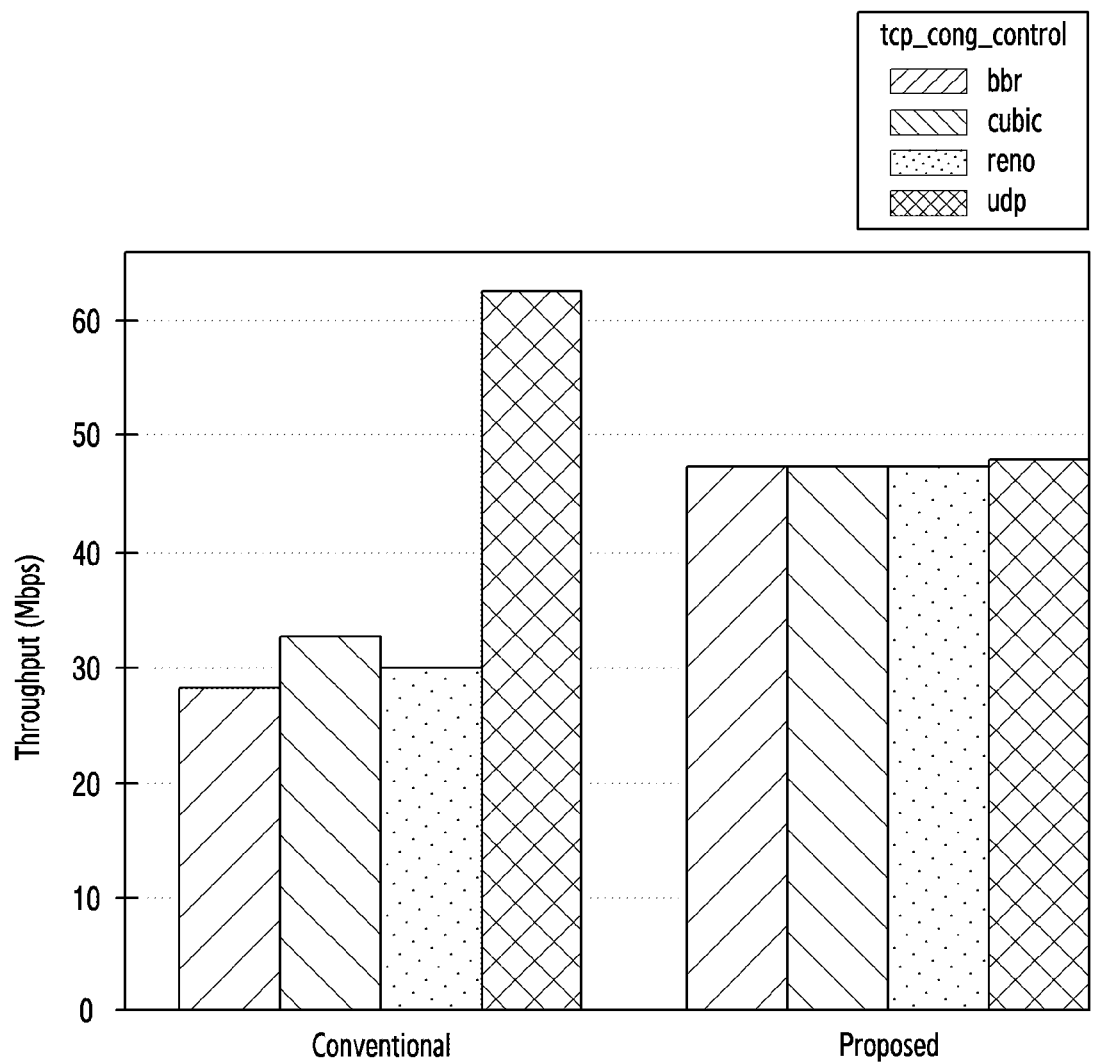
FIG. 9B is a graph illustrating a comparison of upload throughput, according to the prior art and various embodiments.

FIG. 9A is a graph illustrating a comparison of download throughput, according to the prior art and various embodiments. FIG. 9B is a graph illustrating a comparison of upload throughput, according to the prior art and various embodiments.

As shown in FIG. 9A and FIG. 9B, the disclosed method ensures that elephant flows do not overwhelm the network resources and mice flows get equal share of resources.

Figure 10:
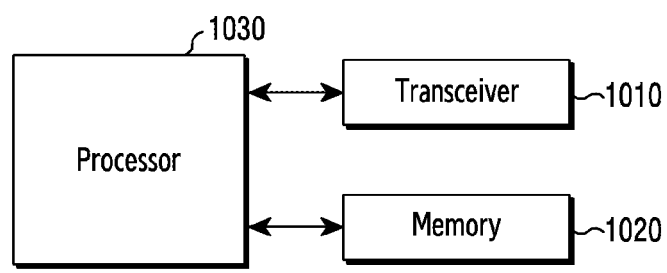
FIG. 10 is a block diagram illustrating an example configuration of a user equipment (UE) according to various embodiments.

FIG. 10 is a block diagram illustrating an example configuration of a UE according to various embodiments. FIG. 10 may correspond to the example of the UE of FIG. 2.

As shown in FIG. 10, the UE according to an embodiment may include a transceiver 1010, a memory 1020, and a processor (e.g., including processing circuitry) 1030. The transceiver 1010, the memory 1020, and the processor 1030 of the UE may operate according to a communication method of the UE described above. However, the components of the UE are not limited thereto. For example, the UE may include more or fewer components than those described above. In addition, the processor 1030, the transceiver 1010, and the memory 1020 may be implemented as a single chip. Also, the processor 1030 may include at least one processor.

The transceiver 1010 collectively refers to a UE receiver and a UE transmitter, and may transmit/receive a signal to/from a network device or a network entity. The signal transmitted or received to or from the network device or a network entity may include control information and data. The transceiver 1010 may include a RF transmitter for up-converting and amplifying a frequency of a transmitted signal, and a RF receiver for amplifying low-noise and down-converting a frequency of a received signal. However, this is only an example of the transceiver 1010 and components of the transceiver 1010 are not limited to the RF transmitter and the RF receiver.

Also, the transceiver 1010 may receive and output, to the processor 1030, a signal through a wireless channel, and transmit a signal output from the processor 1030 through the wireless channel.

The memory 1020 may store a program and data required for operations of the UE. Also, the memory 1020 may store control information or data included in a signal obtained by the UE. The memory 1020 may be a storage medium, such as read-only memory (ROM), random access memory (RAM), a hard disk, a CD-ROM, and a DVD, or a combination of storage media.

The processor 1030 may include various processing circuitry and control a series of processes such that the UE operates as described above. For example, the transceiver 1010 may receive a data signal including a control signal transmitted by the network device or the network entity, and the processor 1030 may determine a result of receiving the control signal and the data signal transmitted by the network device or the network entity.

Figure 11:
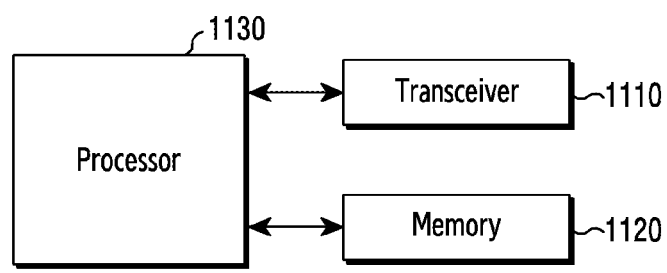
FIG. 11 is a block diagram illustrating an example configuration of a network device according to various embodiments.

FIG. 11 is a block diagram illustrating an example configuration of a network device according to various embodiments. FIG. 11 may correspond to the example of the UE of FIG. 3.

As shown in FIG. 11, the network device according to an embodiment may include a transceiver 1110, a memory 1120, and a processor (e.g., including processing circuitry) 1130. The transceiver 1110, the memory 1120, and the processor 1130 of the network device may operate according to a communication method of the network device described above. However, the components of the network device are not limited thereto. For example, the network device may include more or fewer components than those described above. In addition, the processor 1130, the transceiver 1110, and the memory 1120 may be implemented as a single chip. Also, the processor 1130 may include at least one processor.

The transceiver 1110 collectively refers to a network device receiver and a network device transmitter, and may transmit/receive a signal to/from a terminal or a network entity. The signal transmitted or received to or from the terminal or a network entity may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver. Also, the transceiver 1110 may receive and output, to the processor 1130, a signal through a wireless channel, and transmit a signal output from the processor 1130 through the wireless channel.

The memory 1120 may store a program and data required for operations of the network device. Also, the memory 1120 may store control information or data included in a signal obtained by the network device. The memory 1120 may be a storage medium, such as read-only memory (ROM), random access memory (RAM), a hard disk, a CD-ROM, and a DVD, or a combination of storage media.

The processor 1130 may include various processing circuitry and control a series of processes such that the network device operates as described above. For example, the transceiver 1110 may receive a data signal including a control signal transmitted by the terminal, and the processor 1130 may determine a result of receiving the control signal and the data signal transmitted by the terminal.

Although the present disclosure has been described with reference to various example embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for regulating at least one flow of data transmission performed by a network device in a wireless communication system, the method comprising:
   receiving at least one flow index corresponding to a plurality of applications available at an electronic device in the wireless communication system, wherein the at least one flow index indicates a type of the at least one flow of the data transmission between the electronic device and the network device, and/or a priority of the at least one flow of the data transmission;
   determining whether at least one connection for the data transmission exists between the electronic device and an internet server based on the at least one flow index;
   determining whether the electronic device has multipath capabilities in response to determining that the at least one connection for the data transmission exists between the electronic device and the internet server;
   regulating the at least one flow of the data transmission between the electronic device and the network device at least by transmitting the at least one flow of the data transmission to a plurality of data paths of the multipath capabilities of the electronic device based on the at least one flow index in response to determining that the electronic device has the multipath capabilities;
   regulating the at least one flow of the data transmission between the electronic device and the network device at least by transmitting the at least one flow of the data transmission to a single data path based on the at least one flow index in response to determining that the electronic device does not have multipath capabilities; and
   discarding the at least one flow index received from the electronic device for regulation of the at least one flow of the data transmission between the electronic device and the network device in response to determining that the at least one connection for the data transmission does not exist between the electronic device and the internet server.

2. The method as claimed in claim 1, wherein the transmitting the at least one flow of the data transmission to the plurality of data paths of the multipath capabilities of the electronic device based on the at least one flow index comprises:
   determining whether the at least one flow index related to at least one application rom among the plurality of applications indicates at least one of the type of the at least one flow as an elephant flow or a mice flow, or the priority of the at least one flow as a high priority or a low priority;
   transmitting the at least one flow of the data transmission of the at least one application in a first path among the plurality of data paths of the multipath capabilities of the electronic device in response to determining that the at least one flow index indicates the type of the at least one flow as the elephant flow, and the priority of the at least one flow as the high priority or in response to determining that the at least one flow index indicates the type of the at least one flow as the mice flow, and
   transmitting the at least one flow of the data transmission of the at least one application in a second path among the plurality of data paths of the multipath capabilities of the electronic device in response to determining that the at least one flow index indicates the type of the at least one flow as the elephant flow, and the priority of the at least one flow as the low priority.

3. The method as claimed in claim 2, wherein the first path is a first Round-Trip Time (RTT) path, and the second path is a second RTT path wherein the first RTT path is shorter than the second RTT path.

4. The method as claimed in claim 1, wherein regulating the at least one flow of the data transmission by transmitting the at least one flow of the data transmission to the single data path based on the at least one flow index comprises:
determining whether the at least one flow index related to at least one application among the plurality of applications indicates at least one of the type of the at least one flow as an elephant flow or a mice flow, or the priority of the at least one flow as a high priority or a low priority; and
prioritizing the at least one flow of the data transmission of the at least one application in response to determining that the at least one flow index indicates the type of the at least one flow as the elephant flow, and the priority of the at least one flow as the high priority and/or in response to determining that the at least one flow index indicates the type of the at least one flow as the mice flow, and transmitting the prioritized at least one flow of the data transmission of the at least one application in the single path, and
controlling bandwidth for the at least one flow of the data transmission of the at least one application in response to determining that the at least one flow index indicates the type of the at least one flow as the elephant flow, and the priority of the at least one flow as the low priority.

5. The method as claimed in claim 1, wherein whether the at least one connection for the data transmission exists between the electronic device and the internet server is determined based on a 5-tuple data of the at least one flow index.

6. A method for regulating at least one flow of data transmission performed by an electronic device in a wireless communication system, the method comprising:
monitoring a plurality of parameters associated with a plurality of applications available at the electronic device for a time period, wherein the plurality of parameters comprises at least one of: a type of at least one flow created between the plurality of applications running at the electronic device and a network device, a duration spent by the plurality of applications running at the electronic device in one of foreground and background while using the at least one flow, a date on which the plurality of applications are running on the electronic device to use the at least one flow, a usage pattern of the plurality of applications at the electronic device to use the at least one flow, or a total amount of data transmitted and received by the plurality of applications using the at least one flow;
training at least one Artificial Intelligence (AI) model based on the plurality of parameters associated with the plurality of applications;
detecting the at least one flow of the data transmission between the electronic device and the network device in the wireless communication system, wherein the at least one flow is associated with one or more applications among the plurality of applications available at the electronic device;
determining a type of the at least one flow of the data transmission, and a priority of the at least one flow of the data transmission by applying the at least one AI model on the at least one flow of the data transmission between the electronic device and the network device;
creating at least one flow index for the one or more applications, wherein the at least one flow index indicates the type of the at least one flow of the data transmission, or the priority of the at least one flow of the data transmission; and
transmitting the at least one flow index to the network device for regulating the at least one flow of the data transmission between the electronic device and the network device.

7. The method as claimed in claim 6, wherein the at least one flow index is transmitted to the network device using an Access Traffic Steering, Switching and Splitting (ATSSS) framework via Performance Measurement Function (PMF) protocol.

8. The method as claimed in claim 6, wherein the priority of the at least one flow of the data transmission is determined based on an estimated duration of the at least one flow, and wherein the estimated duration of the at least one flow is determined by applying the at least one AI model on the at least one flow of the data transmission between the electronic device and the network device.

9. A network device for regulating at least one flow of data transmission in a wireless communication system, the network device comprising:
a memory; and
a processor, coupled to the memory, the processor configured to:
receive at least one flow index corresponding to a plurality of applications available at an electronic device in the wireless communication system, wherein the at least one flow index indicates a type of the at least one flow of the data transmission between the electronic device and the network device, and a priority of the at least one flow of the data transmission between the electronic device and the network device;
determine whether at least one connection for the data transmission exists between the electronic device and an internet server based on the at least one flow index;
determine whether the electronic device has multipath capabilities in response to determining that the at least one connection for the data transmission exists between the electronic device and the internet server;
regulate the at least one flow of the data transmission between the electronic device and the network device at least by transmitting the at least one flow of the data transmission to a plurality of data paths of the multipath capabilities of the electronic device based on the at least one flow index in response to determining that the electronic device has the multipath capabilities;
regulate the at least one flow of the data transmission between the electronic device and the network device at least by transmitting the at least one flow of the data transmission to a single data path based on the at least one flow index in response to determining that the electronic device does not has the multipath capabilities; and
discarding the at least one flow index received from the electronic device for regulation of the at least one flow of the data transmission between the electronic device and the network device in response to determining that the at least one connection for the data transmission does not exist between the electronic device and the internet server.

10. The network device as claimed in claim 9, wherein to transmit the at least one flow of the data transmission to the plurality of data paths of the multipath capabilities of the electronic device based on the at least one flow index, the processor is further configured to:
  determine whether the at least one flow index related to at least one application among the plurality of applications indicates at least one of the type of the at least one flow as an elephant flow or a mice flow, or the priority of the at least one flow as a high priority or a low priority;
  transmit the at least one flow of the data transmission of the at least one application in a first path among the plurality of data paths of the multipath capabilities of the electronic device in response to determining that the at least one flow index indicates the type of the at least one flow as the elephant flow, and the priority of the at least one flow as the high priority or in response to determining that the at least one flow index indicates the type of the at least one flow as the mice flow, and
  transmit the at least one flow of the data transmission of the at least one application in a second path among the plurality of data paths of the multipath capabilities of the electronic device in response to determining that the at least one flow index indicates the type of the at least one flow as the elephant flow, and the priority of the at least one flow as the low priority.

11. The network device as claimed in claim 10, wherein the first path is a first Round-Trip Time (RTT) path, and the second path is a second RTT path,
  wherein the first RTT path is shorter than the second RTT path.

12. The network device as claimed in claim 9, wherein to regulate the at least one flow of the data transmission by transmitting the at least one flow of the data transmission to the single data path based on the at least one flow index, the processor is further configured to:
  determine whether the at least one flow index of related to at least one application among the plurality of applications indicates at least one of the type of the at least one flow as an elephant flow or a mice flow, and the priority of the at least one flow as a high priority or a low priority"; and
  prioritize the at least one flow of the data transmission of the at least one application in response to determining that the at least one flow index indicates the type of the at least one flow as the elephant flow, and the priority of the at least one flow as the high priority and or in response to determining that the at least one flow index indicates the type of the at least one flow as the mice flow and transmit the prioritized at least one flow of the data transmission of the at least one application in the single path, and
  control bandwidth for the at least one flow of the data transmission of the at least one application in response to determining that the at least one flow index indicates the type of the at least one flow as the elephant flow, and the priority of the at least one flow as the low priority.

13. The network device as claimed in claim 9, wherein whether the at least one connection for data transmission exists between the electronic device and the internet server is determined based on a 5-tuple data of the at least one flow index.

14. An electronic device for regulating at least one flow of data transmission in a wireless communication system, the electronic device comprising:
  a memory; and
  a processor, coupled to the memory, configured to:
    monitor a plurality of parameters associated with a plurality of applications available at the electronic device for a time period, wherein the plurality of parameters comprises at least one of a type of at least one flow created between the plurality of applications running at the electronic device and a network device, a duration spent by the plurality of applications running at the electronic device in one of foreground and background while using the at least one flow, a date on which the plurality of applications are running on the electronic device to use the at least one flow, a usage pattern of the plurality of applications at the electronic device to use the at least one flow, or a total amount of data transmitted and received by the plurality of applications using the at least one flow;
    train at least one Artificial Intelligence (AI) model based on the plurality of monitored parameters associated with the plurality of applications;
    detect the at least one flow of the data transmission between the electronic device and the network device in the wireless communication system, wherein the at least one flow is associated with one or more applications among the plurality of applications available at the electronic device;
    determine a type of the at least one flow of the data transmission, and a priority of the at least one flow of the data transmission by applying the at least one AI model on the at least one flow of the data transmission between the electronic device and the network device;
    create at least one flow index for the one or more applications, wherein the at least one flow index indicates the type of the at least one flow of the data transmission, or the priority of the at least one flow of the data transmission; and
    transmit the at least one flow index to the network device for regulating the at least one flow of the data transmission between the electronic device and the network device.

15. The electronic device as claimed in claim 14, wherein the processor is further configured to transmit the at least one flow index to the network device using an Access Traffic Steering, Switching and Splitting (ATSSS) framework via Performance Measurement Function (PMF) protocol.

16. The electronic device as claimed in claim 14, wherein to determine the priority of the at least one flow of the data transmission, the processor is further configured to determine an estimated duration of the at least one flow by applying the at least one AI model on the at least one flow of the data transmission between the electronic device and the network device.

* * * * *